(12) United States Patent
Fockele et al.

(10) Patent No.: US 10,207,207 B2
(45) Date of Patent: Feb. 19, 2019

(54) SLM FILTER SYSTEM

(71) Applicants: Matthias Fockele, Borchen (DE); Heinz-Dietmar Schmidt, Rosengarten (DE)

(72) Inventors: Matthias Fockele, Borchen (DE); Heinz-Dietmar Schmidt, Rosengarten (DE)

( * ) Notice: Subject to any disclaimer, the term of this patent is extended or adjusted under 35 U.S.C. 154(b) by 455 days.

(21) Appl. No.: 14/780,260

(22) PCT Filed: Mar. 26, 2014

(86) PCT No.: PCT/EP2014/056061
§ 371 (c)(1),
(2) Date: Sep. 25, 2015

(87) PCT Pub. No.: WO2014/154748
PCT Pub. Date: Oct. 2, 2014

(65) Prior Publication Data
US 2016/0059154 A1 Mar. 3, 2016

(30) Foreign Application Priority Data
Mar. 27, 2013 (DE) .................... 10 2013 205 510

(51) Int. Cl.
*B01D 29/11* (2006.01)
*B29C 64/153* (2017.01)
(Continued)

(52) U.S. Cl.
CPC .......... *B01D 29/111* (2013.01); *B01D 29/114* (2013.01); *B22F 3/1055* (2013.01);
(Continued)

(58) Field of Classification Search
CPC ....... Y02P 10/295; B33Y 80/00; B33Y 10/00; B22F 3/1055; B23K 26/342;
(Continued)

(56) References Cited

U.S. PATENT DOCUMENTS 2,946,446 A * 7/1960 Howard ................ B01D 27/00
210/323.2
9,272,264 B2 * 3/2016 Coupland .......... B01D 53/9436
(Continued)

FOREIGN PATENT DOCUMENTS

DE 19905067 A1 8/2000
DE 10112591 A1 10/2001
(Continued)

OTHER PUBLICATIONS

Eaton, R. (Jun. 30, 2014). What's the Difference Between SLS and SLM—and Why Care? Retrieved from http://www.rapidmade.com/rapidmade-blog/2014/6/30/ycjnxylvpt8n85gqutk5wj67cmx4t7.*
(Continued)

*Primary Examiner* — David C Mellon
*Assistant Examiner* — Liam Royce
(74) *Attorney, Agent, or Firm* — Rothwell, Figg, Ernst & Manbeck, P.C.

(57) ABSTRACT

A method for producing at least one hollow filter element comprising a grid-like wall, wherein the at least one filter element is produced by means of a generative process from a free-flowing or pourable starting material by solidifying the starting material in selective locations, layer by layer at the locations of each layer which correspond to the at least one filter element by inputting energy by means of focused radiation.

13 Claims, 4 Drawing Sheets

(51) Int. Cl.
  *B28B 1/00*     (2006.01)
  *B23K 26/342*   (2014.01)
  *B33Y 10/00*    (2015.01)
  *B22F 3/105*    (2006.01)
  *B01D 46/24*    (2006.01)
  *B33Y 80/00*    (2015.01)

(52) U.S. Cl.
  CPC ............ *B23K 26/342* (2015.10); *B28B 1/001* (2013.01); *B29C 64/153* (2017.08); *B33Y 10/00* (2014.12); *B01D 2046/2437* (2013.01); *B33Y 80/00* (2014.12); *Y02P 10/295* (2015.11)

(58) Field of Classification Search
  CPC ................ B01D 29/114; B01D 29/111; B01D 2046/2437; B01D 39/2034; B28B 1/001; B29C 64/153
  See application file for complete search history.

(56) References Cited

U.S. PATENT DOCUMENTS

| | | | | |
|---|---|---|---|---|
| 2011/0076152 | A1* | 3/2011 | Streng | C09D 1/02 416/241 R |
| 2013/0071608 | A1* | 3/2013 | Suenobu | B01D 46/2429 428/116 |
| 2014/0124430 | A1* | 5/2014 | Herges | B01D 29/15 210/323.2 |

FOREIGN PATENT DOCUMENTS

| | | | | |
|---|---|---|---|---|
| DE | 10236907 A1 | 2/2004 | | |
| DE | 102004041633 A1 | 3/2006 | | |
| DE | 102005032842 A1 | 1/2007 | | |
| DE | 10 2008 030186 A1 | 12/2009 | | |
| DE | 102010029078 A1 | 11/2011 | | |
| DE | 102011075748 A1 | 11/2012 | | |
| EP | 2 156 941 A1 | 2/2010 | | |
| EP | 2156941 A1 * | 2/2010 | ......... | B01D 46/0057 |
| WO | 2012032325 A1 | 3/2012 | | |
| WO | WO-2012032325 A1 * | 3/2012 | ......... | B01D 53/9436 |

OTHER PUBLICATIONS

Binding mechanisms in selective laser sintering and selective laser melting J-P Kruth;Mercelis, P;J Van Vaerenbergh;Froyen, L; Rombouts, M Rapid Prototyping Journal; 2005; 11, 1; ProQuest p. 26.*
Direct selective laser sintering of metals Agarwala, Mukesh; Bourell, David; Beaman, Joseph; Marcus, Harris; Barlow, Joel . Rapid Prototyping Journal ; Bradford vol. 1, Iss. 1, (1995): 26-36.*
Bakan, H. I. (2006). A novel water leaching and sintering process for manufacturing highly porous stainless steel. Scripta Materialia, 55, 203-206. doi:10.1016/j.scriptamat.2006.03.039.*
Search Report cited in the German Basic Application No. 10 2013 205 510.2 dated Oct. 30, 2013, 5 pages.
International Search Report cited in International Application No. PCT/EP2014/056061 dated Jul. 29, 2014, 2 pages.

* cited by examiner

FIGUR 1

SLM FILTER SYSTEM

CROSS REFERENCE TO RELATED APPLICATION

This application is a 35 U.S.C. 371 National Phase Entry Application from PCT/EP2014/056061, filed Mar. 26, 2014, which claims the benefit of German Patent Application No. 10 2013 205 510.2 filed on Mar. 27, 2013, the disclosure of which is incorporated herein in its entirety by reference.

The present invention relates to a method for producing at least one hollow filter element comprising a grid-like wall. The invention further relates to a filter unit comprising at least one filter element of this type and to a filtration device comprising such a filter unit.

Filters for retaining particles from a stream of fluid are used in many technical fields. A wide variety of materials, for example paper, glass fibres or metals, can be used as the filter material depending on the field of application.

The filter efficiency of a filter element on which, as a component of a filtration device, the actual filtration process takes place, is determined from the particle count both before and after filtration. The efficiency of the filtration device as a whole takes into account for example the flow and throughput losses and is thus important for evaluating the total losses of a filter system. Another important parameter in the context of filter elements is the flow resistance thereof, which should be kept as low as possible, wherein the flow resistance is not a constant variable but in fact increases as the amount of dirt caught by the filter element increases.

In the case of what are known as surface filters, the impurities are only separated off at the surface of the filter element or elements. Conventionally, surface filters comprise uniformly arranged pores or gaps which can retain almost all particles of a specific size. However, the ability thereof to capture dirt is generally less than that of what is known as a depth filter which separates off impurities mainly inside the filtering material. Surface filters can be cleaned for example by backwashing, by ultrasound or manually.

One type of surface filter is produced from thin meshes for which predominantly metal threads are used. In the case of sieve or wire mesh filters of this type, the fineness of the filter plays an important role. The filter fineness of a wire mesh is understood to mean the diameter of the largest spherical particle which can just still pass through the mesh. In this case, it should be noted that the ratio of filter surface area to free pore surface area may be unfavourable above a particular filter fineness, and therefore for example only a pore surface area of approximately 4% remains. An unfavourable ratio of filter surface area to free pore surface area also has a disadvantageous effect on the flow resistance of a filter element.

The object of the present invention is to provide a method by means of which filter elements can be produced quickly and in a material-saving manner with high accuracy and precision and improved filtration properties.

According to the invention, the problem above is solved in that the at least one filter element is produced, by means of a generative process, from a free-flowing or pourable starting material by solidifying the starting material in selective locations, layer by layer, at the locations of each layer which correspond to the at least one filter element, by inputting energy by means of focused radiation.

Generative processes allow highly complex and very fine structures to be produced. Generative production processes include inter alia selective laser sintering and selective laser melting which is particularly preferred in this case, in which powdered starting material is either only partially or completely locally melted by laser radiation energy. Instead of laser radiation, in a variant of the method, particle radiation, in particular electron radiation, can be used to remelt the starting material in selective locations. This allows the finest structures to be produced.

A mathematical point which by definition has no dimensions is solidified as a point having specific dimensions by means of the generative process. In a preferred variant of the method according to the invention, the wall thickness of the grid-like wall is determined by said dimensions. The filter walls can accordingly only consist of a single wall thickness of this type, at least in regions. This has a positive effect both on the ratio of filter surface area to free pore surface area and consequently the flow resistance, and on the amount of material required.

In the context of the invention, selective laser melting is applied as the preferred generative process. The devices used for this purpose are referred to as SLM devices and are known in a range of variants, such as those from DE 10 2011 075 748 A1, DE 10 2004 041 633 A1, DE 102 36 907 A1, DE 199 05 067 A1 or DE 10 112 591 A1, the content of which is incorporated herein by reference.

With the selective laser melting process, in order to produce a surface filter element having very efficient filter properties, an extremely finely structured grid wall, e.g. a grid wall which is closed to form a ring, comprising continuous grid holes or grid pores can be produced, the minimum pore dimensions of which can be approximately 10 µm in the current state of development. Furthermore, by using selective laser melting, it is possible to produce the struts or webs which define the grid pores likewise to be extremely thin, e.g. having a diameter of for example 50 µm, without reducing the mechanical stability of the filter. A surface filter which is designed in this manner allows a large throughput of material to be filtered (flow rate) with a very good filter effect and thus retention of microscopically small particles. The material costs of a surface filter element of this type are low, and therefore high-quality materials can also be used in a relatively cost-effective manner.

More preferably, in order to produce the grid-like wall, bars are formed, in that in each layer starting material is solidified point by point in accordance with a point grid having points which overlap one another from layer to layer. The points of the point grid can be arranged on any desired closed, e.g. circular curve. The diameter of said circle is preferably less than 20 mm, more preferably less than 10 mm. In this manner, thin filter elements comprising straight, delicate bars having minimal dimensions are produced. Said dimensions of the bars can be altered by varying the intensity or the focus of the radiation, the starting material used and other parameters. Alternatively or additionally, in the context of the invention, bars having greater cross sections can be formed by means of the generative process, for example by moving the melting beam accordingly during selective laser melting.

Conventional wire meshes are produced by means of a weaving process, individual wires often being arranged alternately one above or under the other. This fine undulation of the wires leads to increased consumption of material by comparison with a straight wire. As a result, by using a generative process and producing non-undulated bars, material and costs can be saved by application of the invention.

The point grid for producing the grid-like wall of a filter element is preferably provided by points having a distance of less than 500 µm, more preferably of less than 100 µm, depending on the desired filter permeability. It is preferred in this case for the grid-like wall to be produced with grid pores which, in at least one dimension, have a pore size of less than 450 μm, preferably less than 50 μm, and more preferably less than 20 μm, depending on the desired filter permeability. Preferably, the pore size is determined from the space between adjacent bars. The pores can thus also be present as a through gap. The pore size can be individually adjusted according to the field of use and application in order to achieve optimum filtration. In experiments, pore sizes of approximately 10 μm have already been achieved using the selective laser melting process. In principle, it is desirable to make the pore size as small as possible for certain filtration purposes, such as being able to filter out biological microparticles, for example in water treatment.

It is further preferred, after a specific number of layers in each case, for a support ring to be produced in one layer by interconnecting the individual points of the point grid in said layer by means of the generative process. These support rings are used to stabilise a filter element and can have a wall thickness which is greater than a single wall thickness. In addition to or instead of the support rings, the individual rings can also be provided to define the pores in their longitudinal direction. It should be noted that an overly high number of such rings can have a negative effect on the flow resistance. Preferably, however, as little material as possible should be used to define the individual pores, in order inter alia to keep the flow resistance low.

More preferably, the at least one filter element is constructed on a base plate. In this case, a prefabricated base plate can be used. However, it is also possible to produce said base plate in the same manner as the at least one filter element by means of the generative process, it being possible to produce the base plate and the filter element in a single construction process.

Within the scope of the invention, it can further be provided to stabilise a plurality of filter elements by means of a supporting structure between the filter elements. In addition, the supporting structure can be used as a cover which shuts off the filter elements at the upper free end thereof which faces away from the base plate. The supporting structure can also be arranged in a position between the upper and lower ends of the filter elements. The supporting structure can additionally be grid-like or can consist of struts extending between the filter elements, can be inserted retroactively between the filter elements or can be produced integrally with the filter elements during the generative process itself.

More preferably, the base plate comprises a hole in each case which is associated with a filter element, the hole associated with the filter element being enclosed by the wall of the filter element which is adjacent to the base plate. The fluid permeating the filter element is then filtered at the grid-like wall thereof and can flow off through the hole in the base plate. The ability to capture dirt can be improved by as high a number of filter elements on the base plate as possible, due to the increased overall filtering surface area.

It can also be provided to produce the at least filter element having a number of grid-like walls which are arranged concentrically, preferably at a radial spacing. Analogously, a plurality of filter elements of different sizes and having different filter finenesses can be nested one inside the other. In this way, the ability of the filter element to capture dirt is increased. In this embodiment, the filter fineness of the individual grid-like walls preferably decreases from the outside inwards. This makes it possible to clean the filter element by backwashing, since the relatively small particles which are caught by a wall placed inside the filter element can pass through the walls having larger pores which are arranged further out.

It is further preferred for the powdered starting material used to be mixed with at least one oligodynamically acting substance before producing the at least one filter element, or to use an alloy comprising at least one oligodynamic component. Oligodynamically acting substances, such as silver or copper, are suitable for sterilising the fluid to be filtered. Due to the low wall thickness of the bars forming the filter element, sufficient coverage of the surface of the bars is ensured even in the case of low concentrations of the substance used.

Another variant of the method according to the invention consists in subjecting the hollow filter element to a coating process after the formation thereof by powder solidification. In this case, a coating making the bars slightly thicker and the pores therebetween slightly smaller is applied to the bars. The coating can be for example a polymer coating, a ceramic coating or the like. Possible coating processes include for example an immersion bath coating or a spray coating or an evaporation deposition coating. The coating material can be or contain an oligodynamic substance.

The coating process can comprise a blowing out step in which, after the coating material is applied to the filter element, any grid pores which have been closed by the coating material before the hardening thereof are opened by blowing out by means of a jet of fluid, preferably a jet of pressurised gas.

The invention further relates to a filtration device comprising a filter unit according to the invention, wherein the filtration device comprises means for applying an electric potential to at least one filter element of the filter unit.

Preferably, the filter unit is electrically insulated with respect to a housing of the filtration device, the housing being kept at the reference potential (ground potential) when the electric potential is applied to the filter element. A voltage is thus applied between the filter element and the filter housing. By applying the electric potential to the filter element, dirt particles having an electric charge of the same polarity as the electric potential of the filter element are electrostatically repelled by said filter element and are thus prevented from settling on the surface of the filter element.

Further advantageous embodiments can be found in the dependent claims and in the embodiments which are described in greater detail with reference to the accompanying drawings. In the drawings:

Figure 1:
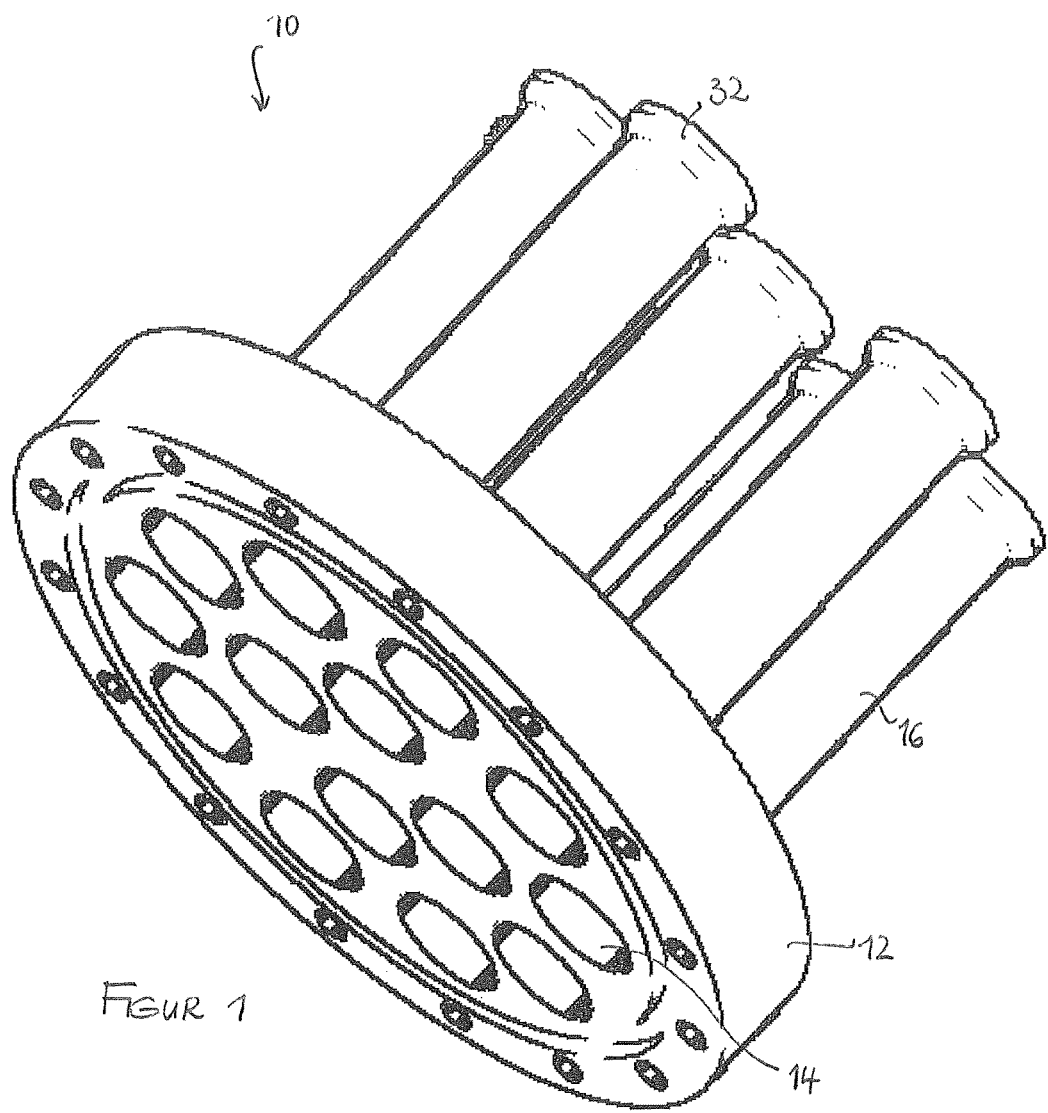
FIG. 1 shows an embodiment of a filter unit according to the invention consisting of filter elements constructed on a perforated base plate, which elements are produced by means of the method according to the invention.

FIG. 1 shows a filter unit 10 comprising a perforated base plate 12 which has been prefabricated according to a suitable production process, on which base plate, in association with each hole 14, a filter element 16 is constructed by means of the method according to the invention, in this case according to the selective laser melting (SLM) process. The plurality of filter elements 16 increases the filtering surface. According to the method according to the invention, the individual filter elements 16 are constructed on the base plate 12 layer by layer at the same time in that powdered starting material applied to the base plate 12 in layers is solidified by inputting energy by means of focused laser radiation at the locations which correspond to the filter elements 16.

The starting material can be for example a material powder from cobalt chrome, titanium, silver, stainless steel or alloys thereof or also ceramic. The base plate 12 can be produced for example from stainless steel. However, other materials are also considered. Due to the usable materials, the filter unit 10 can be constructed in such a way that it is resistant to almost any chemical. In addition, the filter elements 16 are almost wear-free and stable even at high temperatures.

Figure 2:
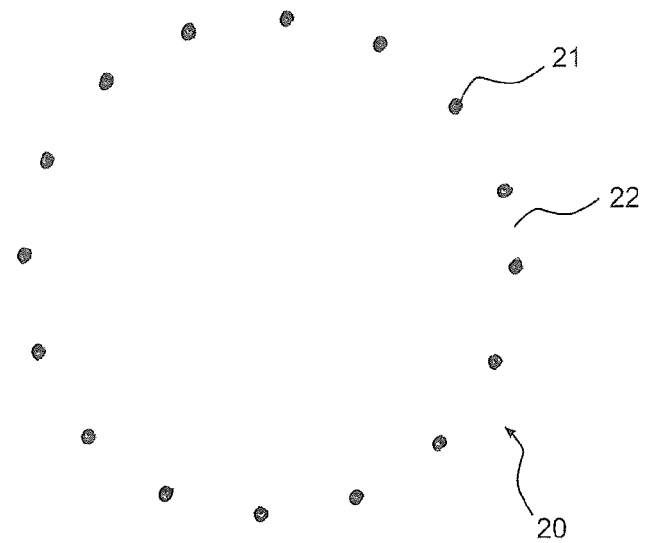
FIG. 2 shows a point grid (not to scale) on the basis of which a filter element can be produced by means of the method according to the invention.
Figure 3:
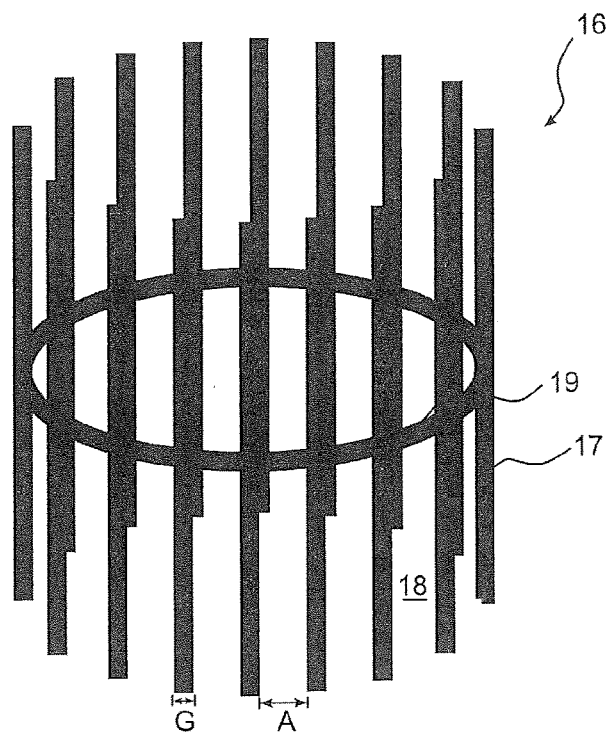
FIG. 3 is a highly schematic view of a portion of a filter element (not to scale) which has been produced according to the method according to the invention.

The point grid 20 of an individual filter element 16 is shown in FIG. 2 schematically and not to scale. In the embodiments shown, the grid points 21 forming the point grid 20 are arranged on a circular line 22. When constructing a filter element 16 layer by layer, the locations corresponding to the grid points 21 in each layer of the starting material are radiated, by means of which they solidify and join to the already solidified points of the underlying layer. As shown in FIG. 3, the bars 17 of a filter element 16 which form in this manner have minimum dimensions G, which are referred to here as a single wall thickness. Said dimensions G are dependent on various parameters such as the type, intensity or focus of the radiation used, the duration of the radiation or the starting material, additionally for example on the particle size distribution and layer thickness if the starting material is in the form of powder. By varying the parameters which influence the single wall thickness, said thickness can be made finer or coarser according to requirements. The wall thickness can also be selected so as to be greater than the single wall thickness at least in regions. In addition, the bars 17 can have a cross section which is greater than the dimensions G at least in one dimension.

The last layer in the production process of the filter element or the filter elements 16 is solidified in full or with a grid structure within the circular line 22 so that the filter elements 16 form a filtering surface which is sealed to the outside. Alternatively, the individual filter elements 16 can be retroactively provided with a cover.

Adjacent bars define the pores 18 of the filter element 16 in the space between said bars, which pores are consequently present in the form of a gap. The pore size A (FIG. 3) in the first dimension which lies in the plane of the base plate can be adapted individually to the required conditions of the field of application of the filter unit 10. By solidifying all the points 21 along the circular line 22 to form a ring 19 after a certain number of layers, the pores 18 can also be delimited in the second dimension which does not lie in the plane of the base plate. These rings 19 can also be used to stabilise the bars of the filter element. In this case, such rings acting as support rings do not have to have a single wall thickness, but can indeed be designed to be thicker. FIG. 2 shows a grid of circular points. Alternatively, the points could be extended for example in the radial direction towards the centre of the grid so that there is a grid of lines which are oriented radially towards the same grid centre, which lines form flat bars in the third dimension which have good stability and a low minimum pore size therebetween.

Figure 4:
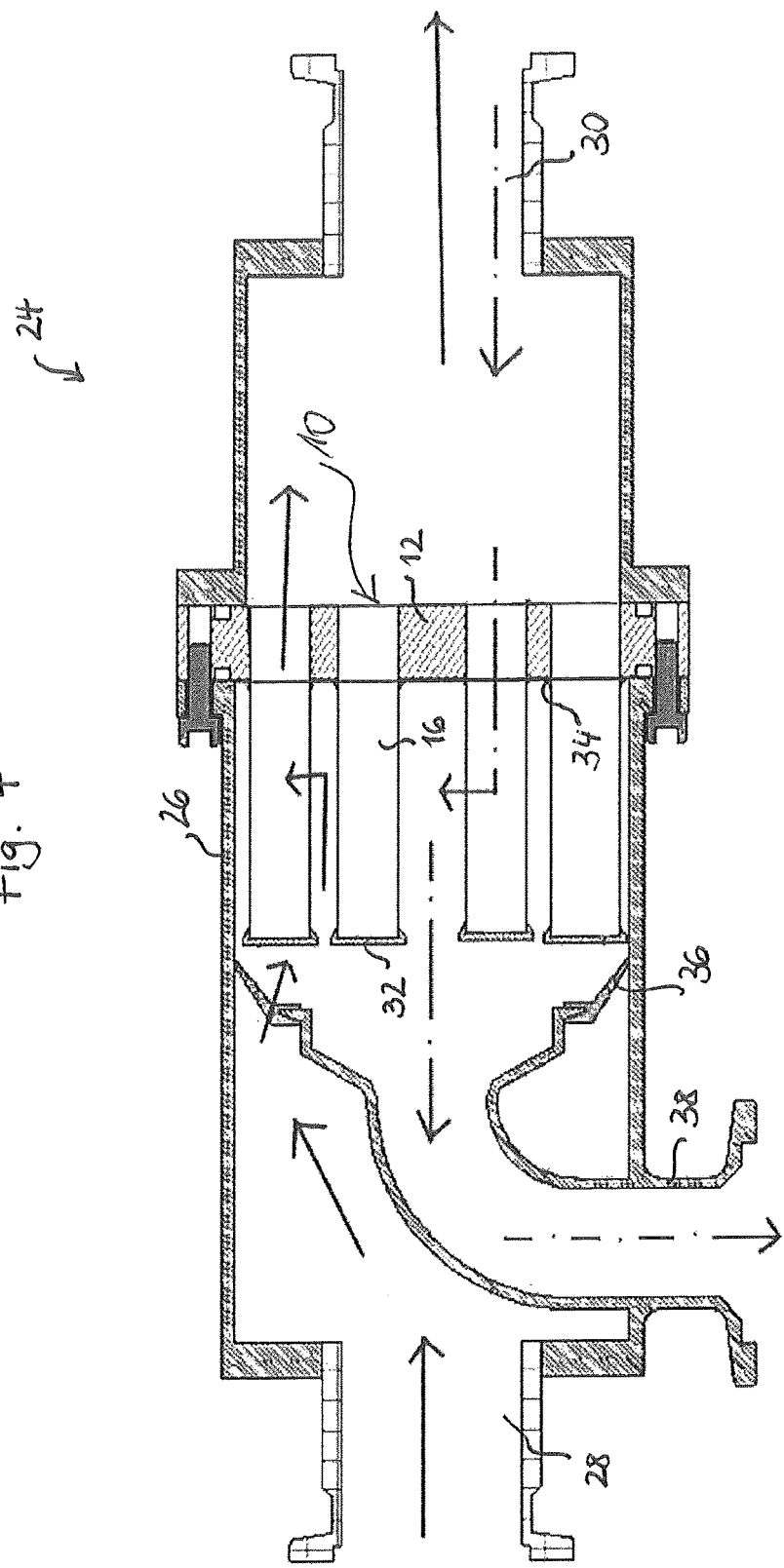
FIG. 4 shows an embodiment of a filtration device in which the filter unit according to the invention is used.

FIG. 4 shows a filtration device 24 comprising a housing 26 made of aluminium, in which the filter unit 10 according to the invention is arranged between an inlet 28 and an outlet 30. The base plate 12 is inserted in the filtration device 24 in such a way that the upper end of the filter elements 16 facing away from the base plate 12 points towards the inlet 28. As can be seen in FIG. 4, the individual filter elements 16 of the filter unit 10 comprise a socket brace 32 at the upper end thereof and a socket brace 34 at the lower end thereof which is adjacent to the base plate. Said braces 32, 34 are used to give the filter elements 16 on the base plate 12 stability and strength. A supporting structure can additionally be provided between the filter elements 16.

In the filtration device 24, due to a difference in pressure between the inlet 28 and the outlet 30, fluid flows ahead of the inlet 28 via the non-return valves 36 to the outlet 30, as is indicated by solid arrows in FIG. 4. In this case, the fluid has to pass through the filter elements 16, as a result of which, depending on the filter fineness of the filter elements 16, impurities are deposited on the outer surface of the filter elements 16.

Conventionally, a conventional filter element having a nominal filter fineness of for example 10 µm still allows a certain number of particles of 50 µm or 100 µm to pass through. However, since even the finest structures can be produced very uniformly, precisely and accurately by means of generative processes, the filter efficiency of the filter unit 10 according to the invention should be higher than in the case of commercially available, similar wire mesh filters.

Impurities which have deposited on the filter elements 16 during the operation of the filtration device 24 can be removed both mechanically and by means of backwashing. As can be seen from FIG. 4, the filter unit 10 can be cleaned during operation by a reflux pulse from the outlet 30 towards the inlet 28 (cf. the dot-dashed arrows), since the filter elements 16 do not allow irreversible blocking due to the construction thereof. The refluxed medium containing the impurities in this case is deposited via the drainage pipe 38 into a coarse particle container (not shown). Dirt-repelling elements between the filter elements 16 are not shown in FIG. 1 and FIG. 4. The dirt-repelling elements are used to prevent dirt which is removed from a filter element 16 from settling on another filter element 16 during the backwashing of the filter unit. The dirt-repelling elements can be in the form for example of posts or sheet metal strips between the filter elements 16. They can also be constructed by means of the SLM process.

Figure 5:
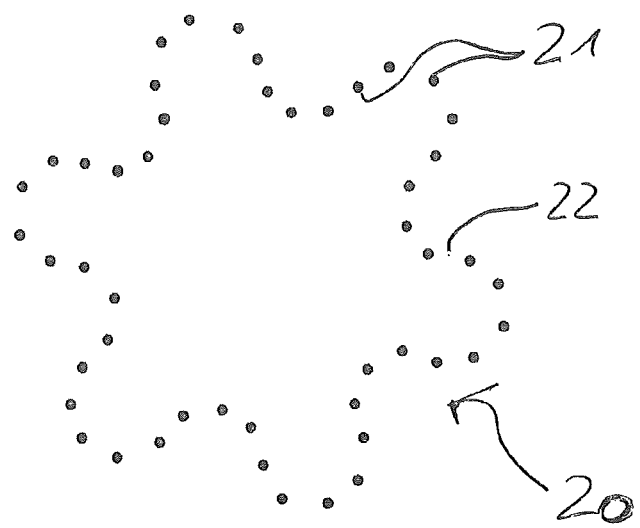
FIG. 5 shows another example of a point grid (not to scale).

At this point, it should be noted once again that other filter periphery contours than the circular contours shown in FIGS. 2 and 3 are also conceivable within the scope of the invention, for example in order to enlarge the filter element surface in the case of a filter unit having approximately the same space requirements. In FIG. 5, for this purpose, an example of a relevant point grid 20 is shown which corresponds to a cross-sectional view of the filter element. In the example in FIG. 5, the grid points 21 lie on an undulating line which closes to form a circle.

Filter units according to the invention can also be produced with various contours with a single wall by means of a generative process considered in this case and in particular according to the selective laser melting process. It is therefore definitely conceivable to provide curvatures in the surface of the filter element in all three spatial directions in order to give the filter element a large surface area. The filter element surface areas could thus be undulating both in the longitudinal section and in the cross section and have for example an overall nap structure or the like. Even in the case of such surface areas, it is possible to produce microscopically small pores, i.e. pores of which the smallest dimension is less than 100 µm and preferably less than 20 µm, using the selective laser melting process. The filtration device has proven very successful in an internal long-term experiment and allows efficient filtration of relatively large amounts of fluid per unit of time. An application example for the use of a filtration device according to the invention is the filtration of ballast water which has to be released from deep-sea vessels into the ocean. In particular, for such applications, a filtration device according to the invention has proven to be an ideal filter due to the high flow rate and due to the very good filter effect. For this purpose, the backwashing ability and the low space requirements of the filtration device have proven to be particularly advantageous.

The filter elements 16 produced according to the method according to the invention are suitable inter alia and in particular both for filtering aggressive media, liquids and gasses, especially in thermal processes, and as filters having a sterilising effect (silver filter).

The invention claimed is:

1. A method for producing a hollow filter element (16) comprising a grid-like wall and a base plate (12), the method comprising:

performing a generative selective laser melting (SLM) process comprising: solidifying a powdered starting material in selective locations, layer by layer at the selective locations (21) of each layer which correspond to the hollow filter element (16), wherein the solidifying comprises applying a focused laser radiation to the powdered starting material at the selective locations (21) of each layer, wherein the hollow filter element (16) comprises an empty space contained within the grid-like wall, and wherein said powdered starting material is selected from the group consisting of metal and ceramic powders; and producing a support ring (19) in one layer between a bottom layer and a top layer of the hollow filter element (16) by means of the generative SLM process, wherein the hollow filter element (16) is constructed on the base plate (12), wherein the base plate (12) has a hole (14) which is associated with the hollow filter element (16), wherein said hole is enclosed by the grid-like wall of the hollow filter element (16) which is adjacent to the base plate (12), and wherein said hole is arranged such that any fluid permeating the hollow filter element flows through said hole.

2. The method according to claim 1, wherein a mathematical point is solidified as a point having specific dimensions (G) by performing the generative SLM process and the wall thickness of the grid-like wall is determined by said dimensions (G).

3. The method according to claim 1, wherein, in order to produce the grid-like wall, bars (17) are formed, in that in each layer the starting material is solidified point by point in accordance with a point grid (20) having points (21) which overlap one another from layer to layer.

4. The method according to claim 3, wherein the point grid (20) is provided by points (21) having a distance of less than 500 µm.

5. The method according to claim 1, wherein the grid-like wall is produced with grid pores (18) which, in at least one dimension, have a pore size (A) of less than 450 µm.

6. The method according to claim 5, wherein the pore size (A) is determined from the space between adjacent bars.

7. The method according to claim 3, wherein the support ring (19) is produced in said one layer by interconnecting the individual points (21) of the point grid (20) in said one layer by means of the generative SLM process.

8. The method according to claim 1, wherein the starting material used is mixed with at least one oligodynamically acting substance before producing the at least one filter element (16).

9. The method according to claim 1, wherein the hollow filter element (16) is subjected to a coating process after the starting material has been solidified layer by layer at the selective locations (21) of each layer which correspond to the filter element, in order to reduce the pore size of the grid pores.

10. The method according to claim 9, wherein the coating process is a dip coating process.

11. The method according to claim 4, wherein the point grid (20) is provided by points (21) having a distance of less than 100 µm.

12. The method according to claim 5, wherein the grid-like wall is produced with grid pores (18) which, in at least one dimension, have a pore size (A) of less than 50 µm.

13. The method according to claim 12, wherein the grid-like wall is produced with grid pores (18) which, in at least one dimension, have a pore size (A) of less than 20 µm.

* * * * *